Patented Feb. 3, 1942

2,272,131

UNITED STATES PATENT OFFICE 2,272,131

NUCLEAR KETONES OF THE CYCLOPENTANOPOLYHYDROPHENANTHRENE SERIES AND PROCESS OF MAKING SAME

Leopold Ruzicka, Zurich, Switzerland, assignor, by mesne assignments, to Ciba Pharmaceutical Products, Incorporated, Summit, N. J., a corporation of New Jersey No Drawing. Application July 12, 1938, Serial No. 218,877. In Switzerland July 22, 1937

18 Claims. (Cl. 260—397.4)

By this invention nuclear ketones of the saturated or unsaturated cyclopentanopolyhydrophenanthrene series are made by treating compounds of this series containing in the nucleus free secondary hydroxyl groups and in a side chain a multiple carbon-carbon-linkage, in which the carbon atom β with respect to the nucleus participates, with an agent capable of transforming secondary carbinol groups into keto groups, if required after reduction of any treble linkage present to a double linkage and if required with temporary protection of any nuclear double linkage present.

In order to reduce an acetylene linkage in the side chain to an ethylene linkage the parent material may be treated for example with a metal such as an alkali metal or zinc in an acid such as acetic acid, or in an alcohol or in a moist ether, or it may be treated with an amalgam such as an alkali amalgam. The reduction may also be performed electrolytically or by means of catalytically activated hydrogen, for example in presence of nickel, cobalt, copper, iron, platinum, palladium, a chromium salt or the like.

In addition to the secondary hydroxyl group in the ring the parent materials may naturally contain like substituents in a side chain and may also contain further substituents such as substituted or unsubstituted primary or tertiary hydroxyl groups, amino-groups or hydrocarbon groups, also halogen atoms, keto-groups, or enol derivatives thereof, or substituted secondary hydroxyl groups. As parent materials there may be named in particular, for example, compounds derived from aetio-cholane, pregnane, oestrane, hydro-oestrane or isomers thereof, having a saturated or unsaturated cyclic nucleus and containing a hydroxyl group in 3, 11, 12 and/or 17-position or also partially substituted by acyloxy-, alkoxy-, keto-groups, or by halogen or the like, and containing in any desired position of the tetracyclic nucleus, for example in 17- or 3-position, for example the following side chains:

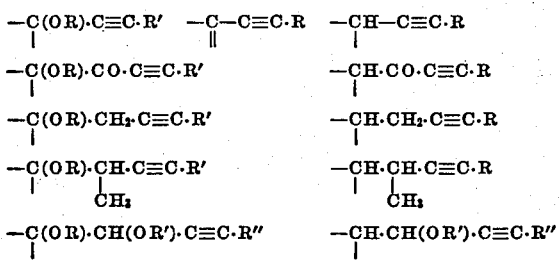

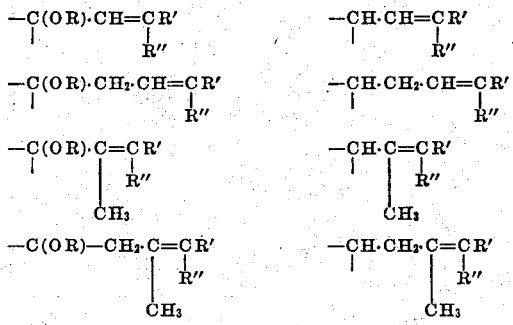

In the foregoing formulae R, R′ and R″ represent hydrogen, a substituted or unsubstituted hydrocarbon residue or an acid residue.

The free nuclear hydroxyl groups may be treated with any agent capable of transforming secondary carbinol groups into keto groups for instance with an oxidizing agent known to be applicable for this reaction such as chromic acid in glacial acetic acid, permanganates or the like. Instead of an actual oxidizing agent there may be used a dehydrogenating agent such as a carbonyl compound (for example a ketone, such as acetone or cyclohexanone) in presence of a metal alcoholate (for example aluminium butylate or propylate or a magnesium-halogen alcoholate) or a metal or metal oxide of the copper-, iron- or platinum-group, if required under reduced pressure, in presence of an inert gas and/or in combination with a hydrogen acceptor.

It has been found surprisingly that under the mild conditions usual for such an oxidation it is quite unnecessary to protect the multiple carbon-carbon-linkage in the side chain. In cases in which the parent material is a compound having a saturated nucleus any protection may consequently be dispensed with; in the case of a compound having an unsaturated nucleus it is frequently advantageous to protect temporarily the nuclear double linkage unless such a protection appears superfluous owing to the particular stability of the atomic grouping in question, for example that of an α:β-unsaturated ketone, and unless special methods of oxidation (for example mercury salts; formaldehyde and a tertiary base) or dehydrogenation methods are used. In most cases such a protection is secured by the addition of halogen or of halogen hydride. Thereby it is possible without difficulty to saturate only the nucleus with the halogen or halogen hydride. In order to restore the double linkage after the oxidation the product may be treated with an agent which causes elimination of halogen or halogen hydride, for example zinc dust or acetic acid, zinc dust and an alcohol or an alkali iodide and benzene on the one hand, or a tertiary base such as pyridine or dimethylaniline, or an alkali or a salt of an organic acid on the other hand. If the double linkage is in $\beta:\gamma$-position with respect to a newly produced keto-group, $\beta:\gamma$-unsaturated ketones may be obtained by splitting off halogen in neutral solution, for example by means of zinc dust in an alcohol, and these may subsequently be converted into $\alpha:\beta$-unsaturated ketones by the action of an acid or basic agent.

The products obtainable by the invention, namely cyclic ketones of the saturated or unsaturated cyclopentanopolyhydrophenanthrene series having unsaturated side chains are therapeutically value compounds or can be converted into such compounds.

The following examples illustrate the invention, the parts being by weight:

Example 1

0.5 part of $\Delta^{5:6}$-17-ethinyl-androstendiol-(3:17) is dissolved in 10 parts of dry acetone, the solution is mixed with a solution of 1 part of tertiary aluminium butylate in 40 parts of absolute toluene and the whole is heated to boiling in a reflux apparatus for 21 hours. After the reaction mixture has cooled it is diluted with 100 parts of ether, the solution is washed with dilute mineral acid and with water, dried and the solvent is evaporated. In this manner there is obtained $\Delta^{4:5}$-17-ethinyl-androstene-3-one-17-ol of melting point 270–272° C.; it may be recrystallized from ethyl acetate.

Example 2

3.14 parts of $\Delta^{5:6}$-17-ethinyl-androstendiol-(3:17) of melting point 240–242° C. are dissolved in 100 parts of ethyl alcohol of 95 per cent strength and after addition of 2.5 parts of a nickel catalyst prepared according to the method of Raney the solution is shaken with hydrogen at ordinary temperature until 1 mol of hydrogen has been absorbed. The solution is filtered and the filtrate is evaporated to dryness under reduced pressure. There is thus obtained $\Delta^{5:6}$-17-vinyl-androstendiol-(3:17) of melting point 183–184° C. in the form of lustrous needles which can be recrystallised from a mixture of ether and methanol or of ether and hexane. If the corresponding 3-acetoxy derivative is used as parent material there is obtained the corresponding 3-acetate of melting point 160–161° C. which can also be produced by acetylating $\Delta^{5:6}$-17-vinyl-androstendiol-(3:17), for example by means of acetic anhydride in the presence of pyridine at room temperature.

2 parts of $\Delta^{5:6}$-17-vinyl-androstendiol-(3:17) are dissolved in 100 parts of dry acetone, a solution of 4 parts of tertiary aluminium butylate in 100 parts of dry benzene is added, and the whole is heated to boiling in a reflux apparatus for about 20 hours. After the reaction mixture has cooled the acetone is expelled under reduced pressure, the residue is mixed with ether and the resulting solution is washed with dilute acid and with water and dried, and the solvent is then evaporated. The residue is purified by adsorption, for example on aluminium oxide, and extraction from the adsorbate by means of a mixture of benzene and ether. There is thus obtained 17-vinyl-testosterone which crystallises from a mixture of ether and pentane in the form of needles of melting point 139–140° C.

For the dehydrogenation there may be used instead of the free $\Delta^{5:6}$-17-vinyl- or -ethenyl-androstendiols their 17-mono-esters, for example acetates, propionates or benzoates which are easily obtainable by partial saponification of the 3:17-diesters. There are thus obtained the corresponding esters of the 17-vinyl-testosterone.

Example 3

314 parts of $\Delta^{5:6}$-17-vinyl-androstendiol-(3:17) of melting point 240–242° C. are dissolved in 150 parts of glacial acetic acid and to the solution are added 1.6 parts of bromine (1 mol) and following this a solution of 1 part of chromium trioxide in 10 parts of acetic acid of 90 per cent strength. The whole is allowed to stand for 16 hours at room temperature, 10 parts of zinc dust are then added and the whole is heated for 20 minutes on the water bath. The solution is then filtered and the filtrate is poured into water. The $\Delta^{4:5}$-17-ethinyl-testosterone which is thereby precipitated can be purified by sublimation in a high vacuum.

If instead of the ethinyl-androstendiol the corresponding 17-ethinyl-androstandiol or a stereo-isomer thereof is used as parent material, there can be obtained in an analogous manner 17-ethinyl-dihydrotestosterone or a stereo-isomer thereof. In this case, however, the bromination is omitted.

The ethinyl-androstandiol can also be converted into ethinyl-dihydrotestosterone by dehydrogenation, for example by means of copper powder under reduced pressure, instead of by treatment with chromic acid in glacial acetic acid.

Example 4

3 parts of $\Delta^{5:6}$-17-vinyl-androstendiol-(3:17) (prepared e. g. as described in Example 2) are dissolved in 150 parts of glacial acetic acid and there are added to the solution 1.6 parts of bromine (1 mol) and a solution of 1 part of chromium trioxide in 10 parts of acetic acid of 90 per cent strength. The whole is allowed to stand over night at room temperature, 10 parts of zinc dust are then added and the whole is heated for 20 minutes at 80° C. It is then filtered with suction and the product is precipitated by addition of water to the filtrate. The crude $\Delta^{4:5}$-17-vinyl-testosterone thus obtained is further purified as described in Example 2.

If the debromination is conducted by boiling with zinc dust and methanol there is obtained $\Delta^{5:6}$-17-vinyl-testosterone which can easily be rearranged to the $\Delta^{4:5}$-compound by the action of alcoholic hydrochloric acid.

What I claim is:

1. A process for the manufacture of nuclear ketones of the cyclopentanopolyhydrophenanthrene series, comprising treating compounds of this series containing a free secondary hydroxyl group in one of the positions 3 and 17 and a multiple carbon-carbon linkage, in which the carbon atom $\beta$ with respect to the nucleus participates, in a side chain in the other one of the positions 3 and 17, with an agent selected from the group consisting of oxidizing and dehydrogenating agents capable of transforming secondary carbinol groups into keto groups.

2. A process for the manufacture of nuclear ketones of the cyclopentanopolyhydrophenanthrene series, comprising treating compounds of this series containing a free secondary hydroxyl group in one of the positions 3 and 17 and a multiple carbon-carbon-linkage, in which the carbon atom β with respect to the nucleus participates, in a side chain in the other one of the positions 3 and 17, with a carbonyl compound in the presence of a metal alcoholate.

3. A process for the manufacture of nuclear ketones of the cyclopentanopolyhydrophenanthrene series, comprising treating compounds of this series containing a free secondary hydroxyl group in one of the positions 3 and 17 and a multiple carbon-carbon-linkage, in which the carbon atom β with respect to the nucleus participates, in a side chain in the other one of the positions 3 and 17, with acetone in presence of tertiary aluminium butylate.

4. A process for the manufacture of nuclear ketones of the cyclopentanopolyhydrophenanthrene series, comprising treating compounds of this series containing a free secondary hydroxyl group in one of the positions 3 and 17 and a multiple carbon-carbon-linkage, in which the carbon atom β with respect to the nucleus participates, in a side chain in the other one of the positions 3 and 17, with chromic acid in glacial acetic acid.

5. A process for the manufacture of nuclear ketones of the cyclopentanopolyhydrophenanthrene series, comprising treating compounds of this series containing a free secondary hydroxyl group in one of the positions 3 and 17 and a triple carbon-carbon linkage, in which the carbon atom β with respect to the nucleus participates, in a side chain in the other one of the positions 3 and 17, with an agent selected from the group consisting of oxidizing and dehydrogenating agents capable of transforming secondary carbinol groups into keto groups.

6. A process for the manufacture of nuclear ketones of the cyclopentanopolyhydrophenanthrene series, comprising treating compounds of this series containing a free secondary hydroxyl group in one of the positions 3 and 17 and an ethinyl radical in the other one of the positions 3 and 17 with an agent selected from the group consisting of oxidizing and dehydrogenating agents capable of transforming secondary carbinol groups into keto groups.

7. A process for the manufacture of nuclear ketones of the cyclopentanopolyhydrophenanthrene series, comprising treating compounds of this series containing in the 3-position a free hydroxyl group and in the 17-position an ethinyl radical and a member of the group consisting of a hydroxy- and an acyloxy-group with an agent selected from the group consisting of oxidizing and dehydrogenating agents capable of transforming secondary carbinol groups into keto groups.

8. A process for the manufacture of nuclear ketones of the cyclopentanopolyhydrophenanthrene series, comprising treating compounds of this series containing in the 3-position a free hydroxyl group and in the 17-position an ethinyl radical and a member of the group consisting of a hydroxy- and an acyloxy-group with an agent selected from the group consisting of oxidizing and dehydrogenating agents capable of transforming secondary carbinol groups into keto groups after reduction of the treble linkage to a double linkage with the aid of hydrogen.

9. A process for the manufacture of nuclear ketones of the cyclopentanopolyhydrophenanthrene series, comprising treating compounds of this series containing a free secondary hydroxyl group in one of the positions 3 and 17 and a vinyl radical in the other one of the positions 3 and 17 with an agent selected from the group consisting of oxidizing and dehydrogenating agents capable of transforming secondary carbinol groups into keto groups.

10. A process for the manufacture of nuclear ketones of the cyclopentanopolyhydrophenanthrene series, comprising treating compounds of this series containing in the 3-position a free hydroxyl group and in the 17-position a vinyl radical and a member of the group consisting of a hydroxy- and an acyloxy-group with an agent selected from the group consisting of oxidizing and dehydrogenating agents capable of transforming secondary carbinol groups into keto groups.

11. The 3-keto-17-ethinyl-cyclopentanopolyhydrophenanthrenes containing in the 17-position a member of the group consisting of a hydroxy- and an acyloxy-group.

12. The 3-keto-17-vinyl-cyclopentanopolyhydrophenanthrenes containing in the 17-position a member of the group consisting of a hydroxy- and an acyloxy-group.

13. Nuclear ketones of the cyclopentanopolyhydrophenanthrene series containing in a side chain in one of the positions 3 and 17 a multiple carbon-carbon linkage in α:β position with respect to the nucleus, a nuclear keto group being present in the other one of the positions 3 and 17.

14. Nuclear ketones of the cyclopentanopolyhydrophenanthrene series containing in a side chain in one of the positions 3 and 17 a triple carbon-carbon linkage in α:β position with respect to the nucleus, a nuclear keto group being present in the other one of the positions 3 and 17.

15. Nuclear ketones of the cyclopentanopolyhydrophenanthrene series containing as a side chain an ethinyl radical in one of the positions 3 and 17, a nuclear keto group being present in the other one of the positions 3 and 17.

16. Nuclear ketones of the cyclopentanopolyhydrophenanthrene series containing as a side chain a vinyl radical in one of the positions 3 and 17, a nuclear keto group being present in the other one of the positions 3 and 17.

17. The 17-ethinyl-testosterone of the formula

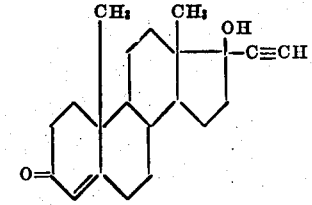

18. The 17-vinyl-testosterone of the formula

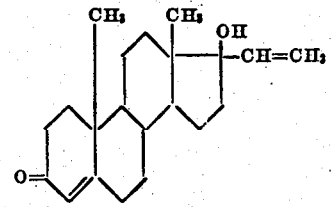

LEOPOLD RUZICKA.